July 17, 1934.  F. W. BRAZEL ET AL  1,966,484
OIL RECLAIMER
Filed March 1, 1933
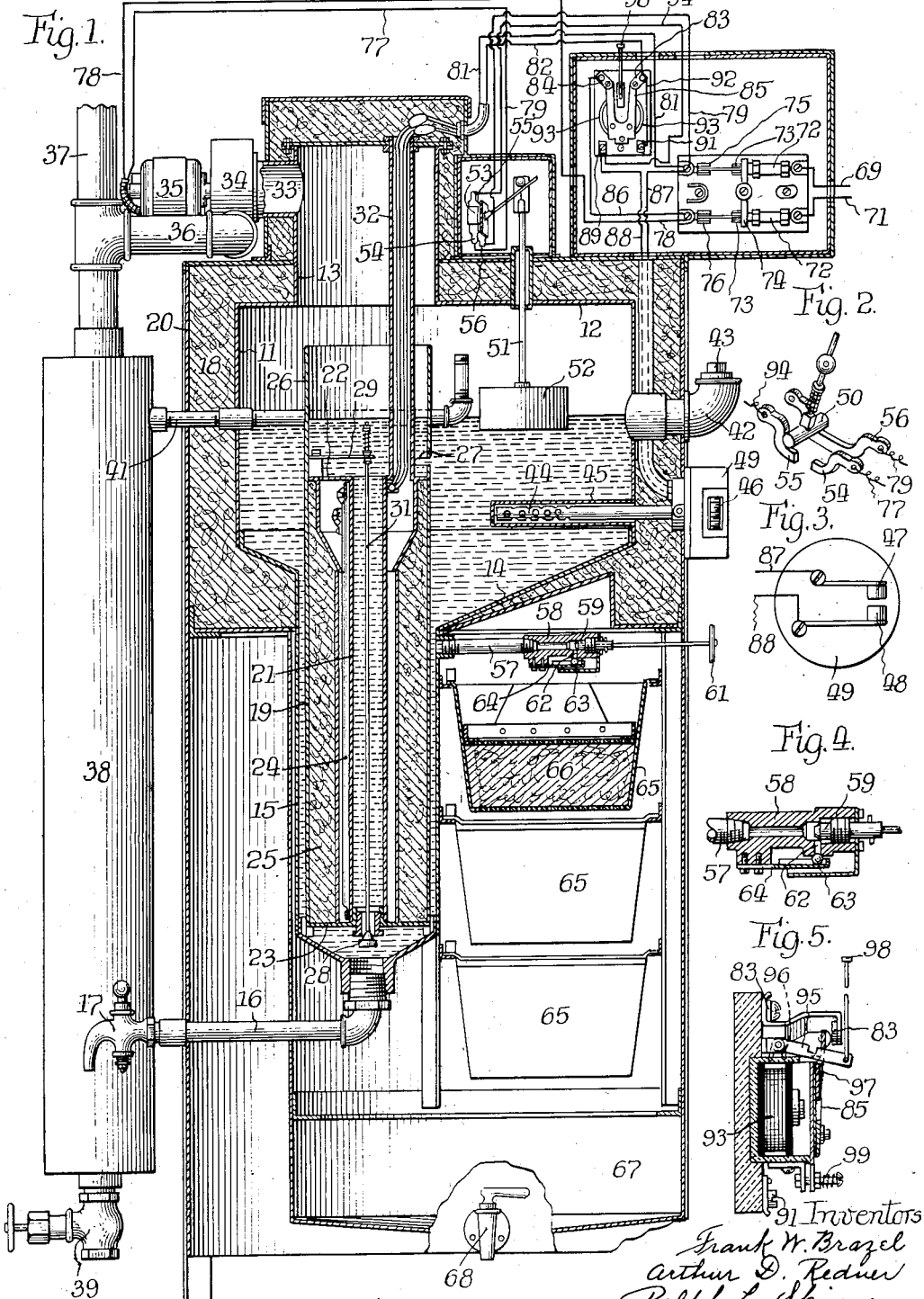

Patented July 17, 1934

1,966,484

UNITED STATES PATENT OFFICE 1,966,484

OIL RECLAIMER

Frank W. Brazel, Arthur D. Redner, Ralph L. Skinner, and Paul Williams, Detroit, Mich., assignors to Skinner Motors, Inc., Detroit, Mich., a corporation of Delaware Application March 1, 1933, Serial No. 659,038

13 Claims. (Cl. 196—16)

The present invention relates to improvement features in appliances for purifying or reclaiming lubricating oil polluted or contaminated by liquid and solid foreign matters, such, for example, as the used oil of internal-combustion engines.

Due to the fact that such oil usually contains vaporizable gasoline and water, the reclamation of the oil, under the action of heat and subatmospheric pressure, is not such a simple problem as might at first appear, because the oil for its purification must be heated to a temperature materially higher than that at which the contained water will be converted into steam, and, unless special provisions are made, the body of oil froths and fluffs and is likely to foam over with the vapors and to be lost.

The invention aims to overcome this and other difficulties and to provide a relatively simple, automatically-controlled apparatus for accomplishing the desired results.

According to the general principle of the invention, a small portion only of the main body of oil to be treated is heated at a time so that there is no material body of hot water or entrained moisture which can be suddenly converted into steam, such heating and the partial vacuum present purifying the specified small quantity of the oil, which, by thermo-siphon action, is automatically returned to the main supply, having been heated to a sufficient temperature to remove the moisture before returning to such main supply in the tank. The principal supply of oil is therefore gradually heated, as will be readily understood.

Stated somewhat differently, a small part of the oil is continuously purified and returned to the main body which in time gradually becomes heated and completely freed of its objectionable volatile and vaporizable constituents, the solid impurities being subsequently removed by filtering.

This invention also aims to provide certain automatic means controlling the operation of the novel apparatus.

To permit those acquainted with this art to understand the invention, in the accompanying drawing a present preferred embodiment of the invention has been depicted and the illustrated appliance is described below, like reference numerals having been employed to designate the same parts of the device throughout the several views.

In the drawing:

Figure 1 is a partial, vertical section through the central portion of the reclaimer;

Figure 2 is a detail of the float-controlled switch;

Figure 3 illustrates the electric circuit of the temperature-indicator;

Figure 4 is an enlarged section through the oil-delivery valve-mechanism; and

Figure 5 is a detail section through the electric relay or switch.

By reference to the drawing, it will be noted that the new apparatus includes a circular, metal oil-tank 11 having a flat top 12 equipped with an upstanding, cylindrical dome 13 offset from, but parallel to, the axis of the tank.

As is clearly shown, the bottom 14 of such tank is of hopper or inverted-cone shape, and it is provided with a downwardly-extended, elongated, cylindrical casing 15 forming a pocket in direct connection with, and parallel to the axis of, the tank and also located directly below the dome 13.

At its bottom, such pocket or supplemental chamber 15 is fitted with a sludge drain-pipe 16 having a controlling valve or faucet 17 by means of which the accumulated sludge may be withdrawn from time to time, as occasion requires.

Such tank 11, including its upper dome 13 and also pocket 15, is supported in a suitably-shaped casing or housing 20, and the tank and its associated parts are fully heat-insulated by surrounding mineral-wool 18 or other appropriate material accommodated in the space between the two separated elements.

The tank and its complementary pocket or lower supplemental reservoir hold the oil while it is undergoing the purifying or reclaiming process.

The vaporization portion of the appliance includes a sheet-metal cylinder 19 located in part in the tank 11 and with its lower portion accommodated centrally in the pocket 15.

Internally such cylinder 19 has a concentric, upright tube or elongated chamber 21 opening through the top wall 22 of the cylinder and through the bottom wall 23 thereof.

Just outside of chamber or tube 21 one or more electric-heaters 24, usually three in number, is or are employed and of which only one is depicted in the drawing, the space between the heater or heaters and the casing 19 being packed with mineral-wool 25 or its equivalent, whereby practically all of the heat generated in the one or more heater-strips 24 is conducted to the chamber 21 and its contents.

On its top such wall 19 has an upstanding, cylindrical baffle 26 of the same diameter open at its top and provided in its side, just above the wall 22, with a slot or delivery-port 27.

As is fully shown, the entrance to the bottom of the inner tube 21 is controlled by a temperature-regulated valve 28, the opening and closing of which is governed by a thermostat 29 located inside of the baffle 26 and connected to the valve 28 by a rod 31 extending down through the tube to the valve, such thermostat, as illustrated, being below the level of the oil undergoing treatment.

A suitable conduit 32, opening through the top wall 22 and through the top of the dome 13, serves to cover and protect the lead-in wires for the electric-heaters, the latter raising the temperature of the oil in the vaporization tube 21 and keeping it in circulation. The lead out for the wires also makes a breather to eliminate pressure in this otherwise air-tight chamber when the heaters are turned on.

The upper portion of dome 13 is connected by a conduit 33 to a suction pump or fan 34 driven by an electric-motor 35, the delivery-pipe 36 of the pump or fan connecting with an erect vapor-outlet pipe 37, the upper end of which preferably discharges outside of the building, the lower end of pipe 37 being connected to the top of an elongated, vertically-disposed diluent-tank 38 equipped with a drain-valve 39 at its bottom.

A bleeder-pipe 41 connects the upper part of the diluent-tank 38 with the interior of the oil-tank 11 above the oil-level therein.

An angular pipe-connection 42 fitted with a removable plug 43 leads from the outside of the casing 20 through the insulation-packing 18 to the interior of the tank 11 and is supplied for the purpose of introducing the impure oil into the tank for reclamation, the plug being inserted to close and seal the structure after such filling.

The temperature of the oil in tank 11 is measured and indicated by an appropriate thermo-metal coil 44 in a pipe or tubular housing 45 extending well into the oil from the outside of the tank, the temperature being shown by a calibrated, semi-circular disc or wheel 46 connected with the coil.

As is illustrated in Figure 3, this indicator closes contact between its two electric terminals 47 and 48 when the desired temperature to complete the reclamation operation has been reached.

In the drawing we have designated such temperature-indicator as a whole by the reference numeral 49.

An upstanding rod 51 of a sheet-metal oil-float 52 in the tank 11 is adapted to operate an electric-switch 53 of the tumbler type which has three contacts 54, 55, 56, as shown, for instance, in Figure 2.

A horizontal pipe 57 connects with the top portion of the pocket 15, its outer end being equipped with a valve-casing 58 fitted with a screw-threaded valve 59 operable by an accessible external handle 61 to open and to close the longitudinal port through the casing.

Such valve-member 58 also includes a downwardly-directed port 62 in its lower portion communicating with the main horizontal passage through the casing 58 and adapted to be opened and closed automatically by a ball 63 mounted on a thermostat 64 carried on the lower portion of the valve-casing.

When the valve 59 is closed, the port 62 is also necessarily inoperative, but when the valve 59 is retracted to its open position, the port 62 may or may not be open, depending upon the position of its governing ball 63.

Below the oil-delivery port 62, the appliance incorporates a plurality of registered, vertically-separated filter racks or screens 65, 65, 65, each of which has a filter-bed 66 of suitable material, so that the oil filtered by the upper bed 66 will be subsequently filtered by the other underlying beds in succession, the completely-filtered oil ultimately being delivered from the lowermost filter-bed into the bottom portion or storage compartment 67 of the casing or housing 20 from which it may be drawn off by a manually-operated valve or faucet 68.

The electrical connections are as follows:

The outside electrical conductor lines 69 and 71 connect through fuses 72, 72 with the terminals 73, 73 of a double-blade electric-switch 74 which has the companion terminals 75 and 76.

One wire 77 of the electric-motor which revolves the suction-fan connects such motor to the single terminal 54 of the float-controlled switch 53, the other wire 78 of the motor being joined to the specified switch-terminal 76.

One wire 81 of the electric-heater is secured to the switch-terminal 75, which in turn, by a wire 79, is joined to terminal 56 of the float-operated switch.

The companion wire 82 of the heater is directly connected to a terminal 83 of an electro-magnet or relay switch, which terminal, when the movable, U-shaped switch-element 85 on the armature of the switch is closed, is electrically joined to the other relay-terminal 84, which in turn by a wire 86 is united with the switch-terminal 76.

One contact 47 of the temperature-indicator 49 is joined, by a wire 87, to the switch-terminal 75, the companion terminal 48 of the indicator, by a wire 88, being united to the electro-magnet-coil terminal 89 of the relay; the other magnet-coil terminal 91 of the relay being joined by a wire 92 to the relay-contact 83, the electro-magnet of such relay or switch being characterized 93.

Another conductor 94 joins the relay-terminal 89 to the remaining contact 55 of the float-operated switch 53.

The relay, as is shown more clearly in Figure 5, has a hinged, notched catch or latch 95 tending to swing upwardly under the influence of its coiled spring 96, such latch or catch extending forwardly through a slot in a plate 97 secured to and upstanding from the relay-armature 98 on which the contact-member 85 is insulatingly mounted.

A push-button 98 is connected to the outer end of the latch and by this means such latch may be depressed to allow the armature to rock away from the magnet under the action of its retracting spring 99, thus permitting its contact 85 to engage the terminals 83 and 84, provided the magnet is deenergized.

The appliance operates practically as follows:

Assuming that the valves 17, 39, 68, and 59 are all closed, the operator removes the plug 43 and pours the polluted oil to be reclaimed or refined into the tank 11 through the connection 42 until the float 52 rises sufficiently to close the switch 53; that is, to make electrical contact between the terminals 54 and 56.

As soon as the proper amount of oil has been thus introduced into the tank, the plug is re-screwed into place, thus sealing the system.

Assuming further that the main-switch 74 has been preliminarily closed, as soon as the movable bar contact 50 of switch 53 bridges contacts 54 and 56, the motor operates the suction-pump and the then-completed circuit of the motor is as follows: terminal 76, wire 78, electric-motor 35, wire 77, contact 54, switch-bar 50, contact 56, wire 79, terminal 75.

Taking for granted that the relay-switch 83—85—84 has been closed by depressing button 98 to release the switch-latch 95, the electric-heater is at once put into operation, its circuit being terminal 75, wire 81, heater 24, wire 82, terminal 83, switch-contact 85, terminal 84, wire 85, terminal 76.

As the temperature of the oil in the vaporization-chamber 21 increases, the small amount of water which the oil contains will be vaporized and the discharged water vapor will be drawn off through the suction-pump and delivered into pipe 37.

Such evolution or discharge of steam or water vapor may cause a small amount of the oil to foam or fluff, but inasmuch as such foaming oil is contained within the baffle 26, the water vapor passes off without any material loss of oil and without any disturbance in the main body of oil in the tank 11.

Whereas this new appliance may not entirely eliminate foaming or frothing of the oil, it nevertheless reduces it in substantial measure and prevents its interference with the main body of oil.

As the temperature of the oil in the chamber 21 increases, other vapors are discharged and pass into the pipe 37 in which some or all of them may be condensed and the condensate flows down into the diluent-tank 38.

When the oil in the chamber 21 reaches a temperature above the vaporizing temperature of both the free and entrained water vapors, the thermostat 29 begins to open the valve 28, so that the heated oil may flow through the port 27 into the tank 11, the oil passing into the chamber 21 at its lower end through the now open valve 28.

Valve 28 starts to open desirably at about 260° Fahrenheit and it will have opened sufficiently not to restrict the thermo-siphon flow of the oil through tube 21 when the oil leaving the port 27 is above 350° Fahrenheit.

The small portion of the total quantity of oil in the appliance in the vaporization-chamber 21 may be raised only to the maxium temperature of 400° to 425° Fahrenheit, which assures the effective removal of the vaporizable contaminating constituents and which, at the same time, eliminates the possibility of cracking or injuring the oil.

The hot oil rises in the chamber 21 and by thermo-siphon action is delivered as indicated through the port 27 into the main body of oil below the surface of the latter, thus creating no substantial mechanical disturbance in the oil-supply.

Thus, it will be understood, the continuous heating of the small portion of the oil causes a gradual circulation of the whole body of oil through the vaporization tube 21, it being obvious that temperature and time are factors in eliminating the objectionable dilution.

It is more or less important that the first time that the oil flows through the small tube its entire water content shall be removed, so that on its subsequent travel therethrough at a higher temperature there is no danger of excessive foaming or fluffing by reason of the steam generated.

In actual practice, the whole body of oil usually travels through the relatively-small heated chamber or tube 21 about three times, the entire amount of water and some diluent being driven off the first time through and the remainder of the diluent being removed during the subsequent travel of oil through the still.

Thus the operation of the apparatus continues until the whole mass of oil reaches a temperature of approximately 325° Fahrenheit, whereupon the temperature-indicator 49 closes the contacts 47, 48 together, with the result that the electro-magnet 93 of the relay becomes energized, its circuit being as follows: Terminal 75, wire 87, contact 47, contact 48, wire 88, terminal 89, electro-magnet coil 93, terminal 91, wire 92, relay-contact 83, relay-contact 85, relay-contact 84, wire 86, switch terminal 76.

Such energization of the relay-coil attracts the relay-armature, thereby opening the switch 83, 85, 84, thus breaking the circuit of the electric-heater at this point, but the suction fan or pump remains in operation so as to continue to abstract the vapors which are given off thereafter from the hot oil.

It is not desirable to filter the oil at the high temperature of 325° Fahrenheit, as oil at that temperature will pass too readily through the filter mass, and, accordingly, means are provided to filter the oil at a lesser temperature, not exceeding 315° Fahrenheit.

When the temperature-indicator 46 registers about 315° Fahrenheit, or even 325° Fahrenheit, valve 59 is manually opened and the thermostat 64 will open the delivery-valve 63 if the oil to be discharged is not in excess of 315° Fahrenheit, so that the oil at that or a lower temperature will be fed into the filters through which it passes successively down into the reservoir 67.

It is to be understood that valve 63 and its control thermostat 64 allow the oil to flow out only at a temperature 315° Fahrenheit or less, it being noted that the discharging oil contacts with the thermostat and this in turn regulates the opening of the valve.

Stated somewhat differently, valve 63 controls the discharge of the oil into the filters at a rate substantially equal to the drop in oil temperature; that is to say, as the temperature decreases, the flow increases, and this is roughly proportioned to the speed of flow through the filter-beds.

The sludge which may accumulate in the pocket 15 does not circulate with the thermo-siphon travel of the oil, because it is too heavy and there is too great adhesion between it and the walls.

When a temperature of 250° Fahrenheit is shown by the indicator 46, all of the oil will have been delivered to the filters, thus assuring that all oil fed to the filters is at a proper temperature for most efficient filtration.

Obviously, as the oil is gradually discharged into the filters, the oil-level in the tank 11 descends, and when it has reached a predetermined point, the float 52 will snap switch-bar 50 away from contact 54, and, while maintaining engagement with contact 56, it will bear on contact 55, breaking the circuit of the electric-motor 35 and thus stopping the suction-fan which could perform no further useful function.

The float is so located that the heaters for the vaporization-chamber 21 are shut off whenever the level of the oil is below port 27, otherwise it would be possible to turn on the unit and not have thermo-siphon action of the oil through chamber or tube 21, resulting in overheating the oil in the tube 24.

Pipe 41 permits the hot air in the upper part of the diluent-tank to enter tank 11, hence in a measure satisfying the vacuum but primarily causing a motion of the vapors in the tank and energizing the removal of the vapors rising from the oil; this arrangement of parts also economically taking advantage of the heat of such air which was previously expelled by the suction-pump.

Assuming that the oil has been refined, purified, and filtered, the reclaimed oil is withdrawn from the storage compartment 67 through its valve 68, the sludge may be delivered through the valve or faucet 17 and the liquid diluent may be discharged through the drain-valve 39, whereupon the operation specified may be repeated.

When the relay opens the switch 83—85—84, the movable contact 85 of such switch is automatically held in open position by the catch or latch 95 engaging the notched plate 97 and the switch must be closed by releasing such latch through downward pressure on the button 98 before the operation of the appliance can again be started.

Such movement of the push-button depresses the catch or latch and releases the armature and its associated contact 85, so that under the action of spring 99 they unitedly swing away from the magnet-coil, and contact 85 then bridges contacts 83 and 84.

In order to prevent the push-button 98 from closing the switch 83—85—84 and completing the circuit of the heater when there is no oil, or an inadequate quantity of oil, in the apparatus, the connection 94 is employed.

When float 52 descends, as set forth above, switch 53 automatically breaks the connection between terminals 54 and 56 and opens the circuit of the electric-motor, thus stopping the suction-fan, but at the same time switch-bar 50 establishes connection between the terminals 55 and 56, hence energizing the magnet-coil 73 through the members 75, 79, 56, 55, 94, 89, 93, 91, 92, 83, 85, 84, 86, 76.

The magnet immediately attracts its armature and opens switch 83—85—84, breaking its own circuit which remains interrupted because the spring-actuated catch or latch 95, by engagement with plate 97, holds the armature of the magnet and the switch-contact 85 from its companion stationary contacts 83 and 84.

If, therefore, it is attempted to institute operation of the apparatus, when it has an inadequate quantity of oil in the tank, by pushing down the button 98 as soon as contact 85 bridges contacts 83 and 84, the circuit through the relay-coil will be reestablished and the switch 83—85—84 will be immediately automatically opened again and the contact 85 will remain locked in open position.

It will be noted that the movable switch contact 85 is in the circuit of the heater as well as in that of the temperature-indicator, and, as a result, the appliance cannot be set into operation if it has an insufficient amount of oil in it, and if a proper amount of oil is employed, as soon as it reaches the predetermined temperature the heater is automatically cut out.

Those acquainted with this art will understand that various changes may be made in the structure shown and described without departure from the principles of the invention defined by the appended claims and without the loss or sacrifice of any of the material benefits or advantages accruing from the employment of the invention.

We claim:

1. In an impure oil reclaimer, the combination of a reservoir tank for the oil to be treated, a pocket at the bottom of, and at its top in communication with, said tank, a chamber in said pocket having means at its lower part to receive oil from said pocket and means at its upper part to deliver the heated oil by thermo-siphon action from said chamber to said tank, means to heat the contents of said chamber, means to withdraw the vapors expelled from the oil heated in said chamber, thermostatic means controlling the circulation of oil from said tank through said chamber and to the tank again, said tank having a floor sloping to said pocket whereby all of the oil in said tank is adapted to be delivered by gravity to said chamber, and means to discharge the purified oil from said reclaimer.

2. In an impure oil reclaimer, the combination of a reservoir tank for the oil to be treated, a pocket at the bottom of, and at its top in communication with, said tank, a chamber in said pocket having means at its lower part to receive oil from said pocket and at its upper part means to deliver the heated oil from said chamber to said tank, means to heat the contents of said chamber, means to withdraw the vapors expelled from the oil heated in said chamber, thermostatic means to terminate the action of said heating means when the oil in said tank reaches a predetermined temperature, float-controlled means governed by the oil-level in said tank controlling the operation of said vapor-withdrawing means, and means to deliver the purified oil from the reclaimer.

3. In an impure oil reclaimer, the combination of a reservoir tank for the oil to be treated, a pocket at the bottom of, and at its top in communication with, said tank, a chamber in said pocket having means at its lower part to receive oil from said pocket and at its top part means to deliver the heated oil from said chamber to said tank, means to heat the contents of said chamber, means to withdraw the vapors expelled from the oil heated in said still, means to discharge the oil from the upper portion of said pocket, and thermostatic means governed by the temperature of the discharging oil regulating said discharge means.

4. In an impure oil reclaimer, the combination of a reservoir tank for the oil to be treated, a pocket at the bottom of, and at its top in communication with, said tank, a chamber in said pocket having means at its lower end to receive oil from said pocket and at its upper part means to deliver the heated oil from said chamber to said tank, means to heat the contents of said chamber, means to withdraw the vapors expelled from the oil heated in said chamber, a baffle on the top of said chamber extending above a predetermined oil-level in said tank, said delivery means including a port in said baffle below said predetermined oil-level in said tank, and means to discharge the purified oil from said reclaimer.

5. In an impure oil reclaimer, the combination of a reservoir tank for the oil to be treated, a pocket at the bottom of, and at its top in communication with, said tank, a chamber in said pocket having means at its lower end to receive oil from said pocket and at its upper part means to deliver the heated oil from said chamber to said tank, said tank having a floor sloping to said pocket whereby all of the oil in said tank is adapted to be delivered to said chamber, means to heat the contents of said chamber, means to withdraw the vapors expelled from the oil heated in said chamber, a baffle on the top of said chamber extending above a predetermined oil-level in said tank, said delivery means including a port in said baffle below said predetermined oil-level in said tank, a thermostat in said baffle adapted to be immersed in the oil therein, a valve controlling the admisson of oil from said pocket to said chamber, means connecting said thermostat and valve whereby the thermostat governs the opening and closing of said valve, and means to discharge the purified oil from said reclaimer.

6. In an impure oil reclaimer, the combination of a reservoir tank for the oil to be treated, a pocket at the bottom of, and at its top in communication with, said tank, a chamber in said pocket having means at its lower part to receive oil from the pocket and means at its upper part to deliver the heated oil from said chamber to said tank, means to heat the contents of said chamber, means to withdraw the vapors expelled from the oil heated in said tank, thermostatic means controlling the circulation of oil from said tank through said chamber, means to discharge the oil from the upper portion of said pocket, a manually-operated valve and a thermostatically-operated valve in series relation controlling the oil delivery through said discharge means, said manually operated valve being between said thermostatically-operated valve and said pocket.

7. In an impure oil recalimer, the combination of a reservoir tank for the oil to be treated, a pocket at the bottom of, and at its top in communication with, said tank, a chamber in said pocket, means to heat the contents of said chamber, means to withdraw the vapors expelled from the oil heated in said chamber, thermostatic means controlling the circulation of oil from said tank through said chamber, said tank having a floor sloping to said pocket whereby all of the oil in said tank may be delivered to said pocket, a baffle at the top of said chamber extending above a predetermined oil-level in said tank and having a port below said oil-level, the heated oil from said chamber being delivered inside of said baffle and then through said port into said tank, and means to discharge the purified oil from said reclaimer.

8. In an impure oil reclaimer, the combination of a reservoir tank for the oil to be treated, a pocket at the bottom of, and at its top in communication with, said tank, a chamber in said pocket having means at its lower end to receive oil from said pocket and means at its top part to deliver the heated oil from said chamber to said tank, means to heat the contents of said chamber, a diluent-tank, a vapor-outlet pipe connected to the upper part of said diluent-tank, means to withdraw the vapor expelled from the oil heated in said chamber and to deliver them into said vapor-outlet pipe, a bleeder-connection from the top portion of said diluent-tank into said reservoir tank at a point above a predetermined oil-level in said reservoir tank, and means to discharge the purified oil from said reclaimer.

9. In an impure oil reclaimer, the combination of a reservoir tank for the oil to be treated, a pocket at the bottom of, and at its top in communication with, said tank, said tank having a floor sloping to said pocket whereby all of the oil in said tank may flow into said pocket, a chamber in said pocket having means at its lower end to receive oil from said pocket and means at its top part to deliver the heated oil from said chamber to said tank, means to heat the contents of said chamber, a baffle at the top of said still extending above a predetermined oil-level in said tank and having a port below said oil-level, the heated oil from said chamber being delivered inside of said baffle and then through said port into said tank, a valve controlling the admission of oil from said pocket into the lower portion of said chamber, a thermostat in said baffle below said oil-level, means connecting said thermostat and valve whereby the action of said valve is governed by said thermostat, a diluent-tank, a vapor-outlet pipe connected to the upper part of said diluent-tank, means to withdraw the vapors expelled from the oil heated in said chamber and to deliver them into said vapor-outlet pipe, a bleeder-connection from the top portion of said diluent-tank into the reservoir tank at a point above a predetermined oil-level in said tank, thermostatic means to terminate the action of said heating means when the oil in said tank reaches a predetermined temperature, float-controlled means governed by the oil-level in said tank controlling the operation of said vapor-withdrawing means, means to discharge the oil from the upper portion of said pocket, and a manually-operated valve and a thermostatically-operated valve in series relation controlling the oil delivery through said discharge means, said manually-operated valve being located between said thermostatically-operated valve and said pocket.

10. In an impure oil reclaimer, the combination of a reservoir tank for the oil to be treated, a pocket at the bottom of, and at its top in communication with, said tank, a chamber in said pocket having means at its lower portion to receive oil from said pocket and means at its upper part to deliver the heated oil from said chamber to said tank, an electromagnetically-opened relay having its magnet in series with its switch, electric means to heat the contents of said chamber, thermostatic means controlling the circulation of oil from said tank through said chamber and to the tank again, means to discharge the purified oil from said reclaimer, a circuit for said heating-means including said switch only of said relay, a circuit-closer adapted to be closed when the oil in said tank reaches a predetermined temperature, and a circuit including said circuit-closer and the magnet and switch of said relay, whereby when the predetermined temperature of the oil in the tank is attained said relay-switch is automatically opened breaking the circuits of said heating-means and said circuit-closer.

11. The structure set forth in claim 10 in combination with manually-releasable means to lock said relay-switch in open condition.

12. The structure set forth in claim 10 in combination with a float in said tank, a switch closed by said float when the oil level in the tank has descended to a predetermined point, and a circuit for said float-controlled switch including said relay-magnet and relay-switch, whereby said relay-switch cannot remain closed unless a definite quantity of oil is present in the tank.

13. The structure set forth in claim 10 in which the relay-switch has a spring tending to close the switch and in combination with manually-releasable means to lock said relay-switch in open position, a float in said tank, a switch closed by said float when the oil level in said tank has descended to a predetermined point, and a circuit for said float-controlled switch including said relay-magnet and relay-switch, whereby said relay-switch cannot remain closed unless a definite quantity of oil is present in the tank.

FRANK W. BRAZEL.
ARTHUR D. REDNER.
RALPH L. SKINNER.
PAUL WILLIAMS.